United States Patent
Bayer et al.

(10) Patent No.: US 8,290,270 B2
(45) Date of Patent: Oct. 16, 2012

(54) METHOD AND SYSTEM FOR CONVERTING IMAGE TEXT DOCUMENTS IN BIT-MAPPED FORMATS TO SEARCHABLE TEXT AND FOR SEARCHING THE SEARCHABLE TEXT

(75) Inventors: Theodore F. Bayer, Annapolis, MD (US); Donald R. Adkins, Pasadena, MD (US); Gregory A. Corbin, Baltimore, MD (US)

(73) Assignee: Syscom, Inc., Baltimore, MD (US)

( * ) Notice: Subject to any disclaimer, the term of this patent is extended or adjusted under 35 U.S.C. 154(b) by 1390 days.

(21) Appl. No.: 11/871,349

(22) Filed: Oct. 12, 2007

(65) Prior Publication Data

US 2008/0089594 A1    Apr. 17, 2008

Related U.S. Application Data

(60) Provisional application No. 60/851,799, filed on Oct. 13, 2006.

(51) Int. Cl.
*G06K 9/34* (2006.01)
*G06K 7/10* (2006.01)

(52) U.S. Cl. ........................ 382/179; 382/321

(58) Field of Classification Search ............... 382/176, 382/190, 173, 177, 178, 179, 198, 209, 299, 382/272, 275, 305, 321; 348/465, 722; 709/217; 704/8
See application file for complete search history.

(56) References Cited

U.S. PATENT DOCUMENTS

| | | | |
|---|---|---|---|
| 6,125,362 A * | 9/2000 | Elworthy | ............................ 1/1 |
| 6,608,930 B1 | 8/2003 | Agnihotri et al. | |
| 6,937,766 B1 | 8/2005 | Wilf et al. | |
| 7,469,063 B2 * | 12/2008 | Koyama et al. | ................ 382/187 |
| 2008/0002893 A1 | 1/2008 | Vincent et al. | |
| 2008/0002914 A1 | 1/2008 | Vincent et al. | |
| 2008/0002916 A1 | 1/2008 | Vincent et al. | |

FOREIGN PATENT DOCUMENTS

WO    2007/072578    3/2007

OTHER PUBLICATIONS

P. Sibun and A. L. Spitz, "Language Determination: Natural Language Processing from Scanned Document Images." Proceedings of the 4th Conference on Applied Natural Language Processing, Stuttgart Germany, pp. 15-21, 1994.*

(Continued)

*Primary Examiner* — Vu Le
*Assistant Examiner* — Andrae S Allison
(74) *Attorney, Agent, or Firm* — Harness, Dickey & Pierce, P.L.C.

(57) ABSTRACT

A system 10 and method for searching image text documents includes a content repository 12 storing image documents having text images therein. An image text transformer 14 performs optical character recognition on the image documents to form optical character recognition results and creates a reflection repository 22 having reflection files therein corresponding to the image documents from the optical character recognition results. A search engine 38 searches the reflection files and a user device 30 displays a first reflection file from the reflection files or a first image document from the image documents in response to searching. The files are displayed on a display 32 associated with a user device 30.

32 Claims, 6 Drawing Sheets

OTHER PUBLICATIONS (Tong & Evans 1996) Tong, X and Evans, D. A.A Statistical Approach to Automatic OCR Error Correction in Context. In: Proceedings of the fourth Workshop on Very LargeCorpora, 88-100, Copenhagen, Denmark, 1996.*

Sato T. et al: "Video OCR for digital news archive" Content-Based Access of Image and Video Database, 1998. Proceedings., 1998 IEEE International Workshop on Bombay, India Jan. 3, 1998, Los Alamitos, CA USA, IEEE Comput. Soc, US, 1998, pp. 52-60, XP010261519.

Hadhoud, M. M. et al: "New trends high resolution image processing" Photonics and its Application, 2004. The fourth workshop on Giza, Egypt May 4, 2004, Piscataway, NJ, USA, IEEE, 2004, pp. 1-23, XP010737924.

KMWorld Names WebQL 3.0 in "Trend-Setting Products of 2006," www.ql2.com/news/press_releases/press_release_kmwtsp06_082506.php.

QL2 Software Unveils WebQL 3.0, Computing News Press Service © 2006 Computing News :: home page.

Business Intelligence Lowdown, "Image Text Search Tool," Mar. 7, 2006, www.businessintelligencelowdown.com/2006/03/image_text_sear.html.

* cited by examiner

METHOD AND SYSTEM FOR CONVERTING IMAGE TEXT DOCUMENTS IN BIT-MAPPED FORMATS TO SEARCHABLE TEXT AND FOR SEARCHING THE SEARCHABLE TEXT

CROSS-REFERENCE TO RELATED APPLICATIONS

This application claims the benefit of U.S. Provisional Application No. 60/851,799, filed on Oct. 13, 2006, the description of which is hereby incorporated by reference.

FIELD

The present disclosure relates generally to searching documents and, more specifically, to searching for information within an image text document.

BACKGROUND

The statements in this section merely provide background information related to the present disclosure and may not constitute prior art.

Searching text documents using a search engine is well known. Searching takes place using the text within the document to identify relevant search results.

Often times, businesses receive a large quantity of non-text-based material. The non-text material may be referred to as image text documents if the image contains a number of words. Image text documents are images of words but the words are not searchable using a search engine. The text appears as a picture or image only and, thus, cannot be searched. The image text files may originate from various sources including faxes, forms, charts, diagrams, pictures, and the like. Often times, metadata may be stored with the image to help identify the image. The metadata may contain various titles, key people, or the like. The metadata may be manually entered for each document.

When searching image text documents, only the metadata itself is searched. The search results may have limited accuracy due to the limited nature of the metadata. Thus, the documents found in the search may be limited because there is not enough identifying information in the metadata. Consequently, desirable information may be overlooked. Therefore, it is desirable to improve the results of search engines when faced with image text documents.

SUMMARY

The present disclosure is particularly suitable for various types of enterprises that have a large number of documents. The disclosure allows improved search results by converting image text documents to text documents and searching using the text documents.

In one aspect of the invention, a method includes performing optical recognition on image text documents having text images therein to form optical character recognition results, creating reflection files corresponding to the image documents from the optical character recognition results, storing the reflection files in a reflection repository, searching the reflection files, and displaying a first reflection file from the reflection files or a first image document from the image documents in response to searching. Optical character recognition may be used with various types of improvements, including spell checking, grammar checking, and linguistic analysis. The text documents formed from the image text documents may have its content searched so that more accurate results are obtained when searching.

In a further aspect of the invention, a system includes an image text transformer that performs optical character recognition on image documents to form optical character recognition results and creates reflection files corresponding to the image documents from the optical character recognition results. A search engine searches the reflection files and a user device displays a first reflection file from the reflection files or a first image document from the image documents in response to searching. Thus, the displayed results may take different form file achieving a high level of search confidence.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
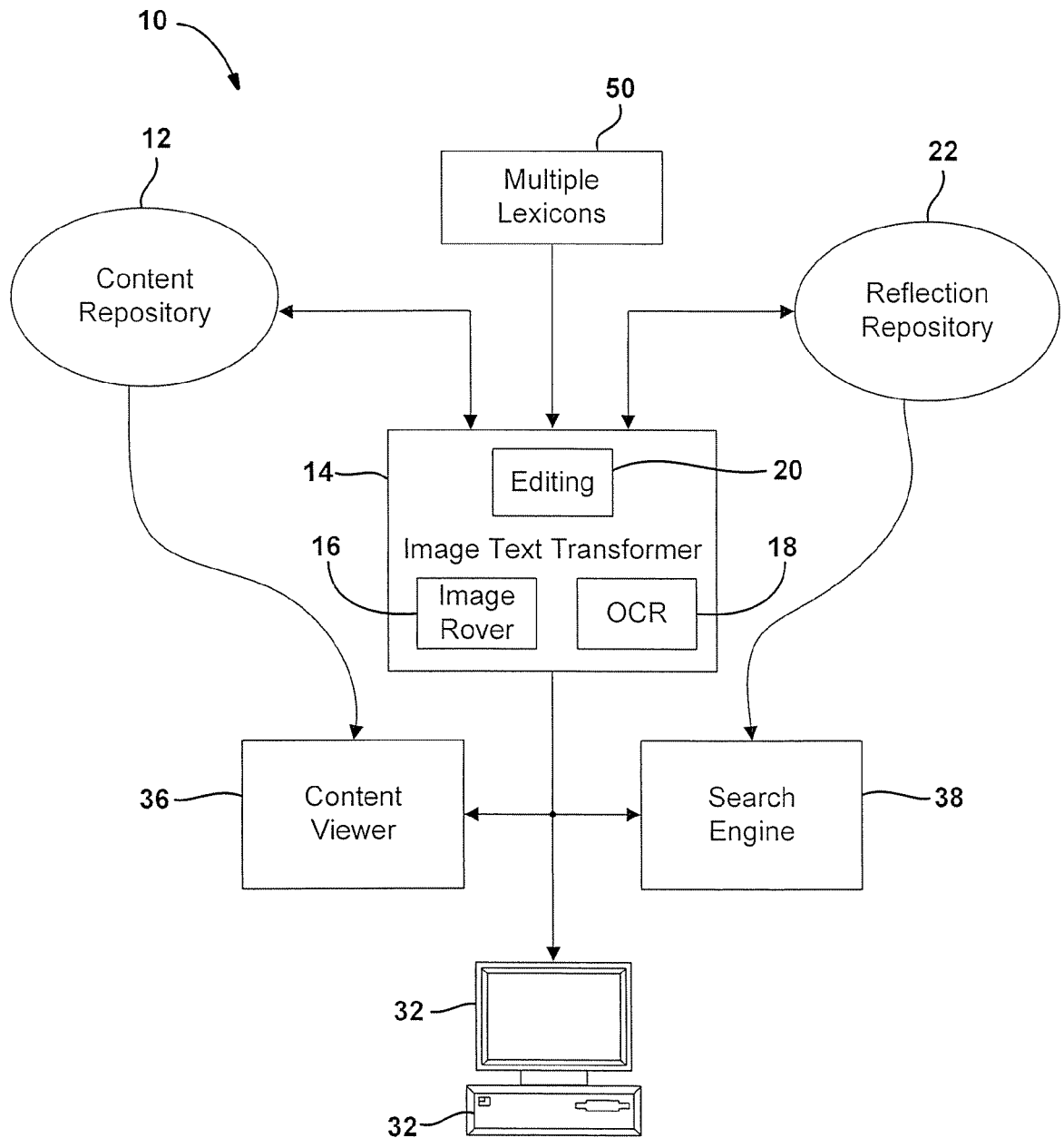
FIG. 1 is a block diagrammatic view of a system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Referring now to FIG. 1, a document searching system 10 is illustrated having a content repository 12. The content repository 12 is a storage device that includes image text files from various sources. Image text refers to text stored in bit-mapped format. The image text files may originate from various sources including faxes, forms, charts, diagrams, pictures, and the like.

An image text transformer 14 is in communication with the content repository 12. The image text transformer 14 includes an image rover 16 for extracting and collecting images from the content repository 12. One suitable example of a rover is Syscom's Meta Image Rover.

The image text transformer 14 also includes an optical character recognition (OCR) module 18. Optical character recognition module 18 forms optical character recognition results and creates reflection files in response to the results. The optical character recognition results may be edited or changed in the editing module 20. As will be described below, the editing module 20 may include various types of editing, including linguistically analyzing the optical character recognition results, spell checking the optical character recognition results, and grammar checking the optical character recognition results. Various types of editing or no editing of the optical character recognition results may take place depending on the particular system.

The optical character recognition module may perform OCR on images in the content repository. Also, the OCR may be reused from another application such as facsimile recognition. One example is when facsimile recognition performs OCR, only certain recognized fields are retained to form an index. The remaining OCR results are discarded. The present disclosure may use the OCR results to form or add to the reflection repository 22.

The image text transformer 14 generates reflection files that are stored in the reflection repository 22. The reflection repository 22 may be a separate memory storage device than the content repository 12. The reflection repository 22 may be combined with the content repository 12 in terms of physical location. Also, the reflected documents may also be stored together with the respective document in the content repository. That is, a reflected document and the image text document may be linked. The documents may be linked so that the same security for the image text documents is provided to the reflected documents. The image text documents may be stored in the reflection repository 22 with a unique file extension in a form that is compatible for crawling and indexing by various search engines. A suitable search engine is Omnifind's® crawler/indexer or Google®.

The reflection document may be in various formats. For example, the transform document may be in a rich text format (.rtf), a .pdf format or a .txt format. In a .txt format, the formatting may be removed. This may allow the reflected document to occupy less memory space.

A user device 30, having a display 32, may also be coupled to the image text transformer 14. The user device 30 may be a networked computer. The user device 30 may be used to modify batches and control the functioning of the image text transformer 14.

The user device 30 may also contain a content viewer 36 and a search engine 38. The content viewer 36 and the search engine 38 may be incorporated within the user device 30 as software. The search engine 38 may be various types of search engines that are used to crawl, parse and index the reflected documents stored in the reflection repository 22. The search engine 38 searches the various reflected documents and returns search results. The content viewer 36 allows the user to generate various views based upon the search results from the search engine 38. The content viewer 36 may, for example, allow the user 32 to display the reflected document from the reflection repository 22 or the image text document from the content repository 12. Further, the content viewer 36 may allow both the reflected document and the image text document to be viewed side by side. This will be further described in FIG. 7.

Multiple lexicons 50 may be used in the editing module 20. The lexicon 50 may be derived from various sources including common words, proper names, client-specific lexicons (custom), and industry-specific lexicons.

Figure 2:
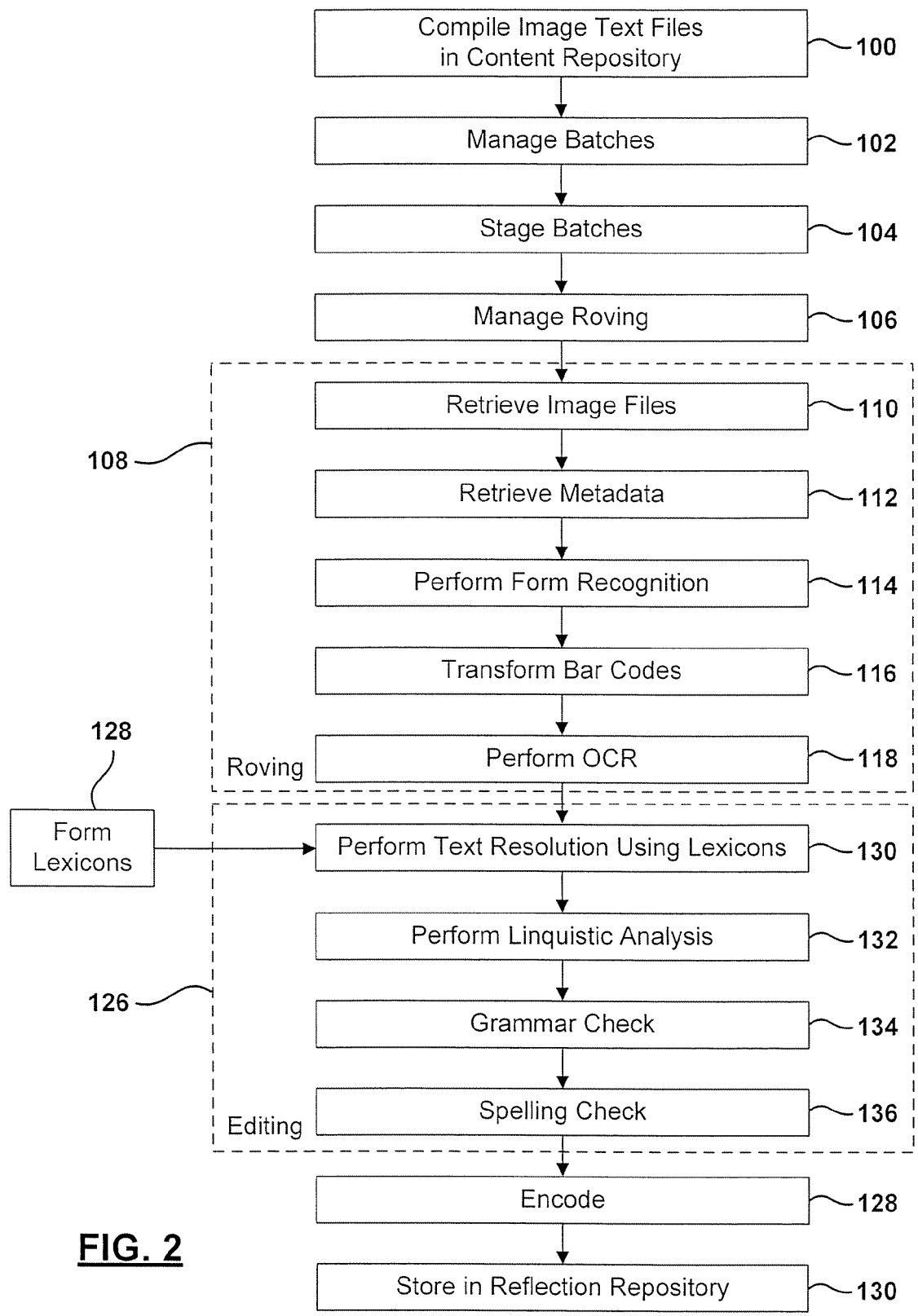
FIG. 2 is a flowchart illustrating a method of converting image text documents to text documents according to the present disclosure.

Referring now to FIG. 2, a method of transforming image text documents and of forming the reflection repository 22 is set forth. In step 100, the image text files are stored in the content repository 12. The image text files may be compiled from various sources external to a specific company through the internet, or the like. Each of the image text files may also have metadata associated therewith.

In step 102, the various batches are managed. Batches define a logical unit of work or set of documents upon which the system services will operate. The system will operate on the set of documents in a batch sequentially. Managing the batches also includes coordinating threads to take advantage of processing schedules using multiple CPUs and manage memory. The system may operate upon multiple batches in parallel. The system also allows administrators to coordinate system execution time frames and batch sizes. Managing batches 102 may also include staging the batches including kicking off the batch of work to the staging phase.

In step 104, the batches may be staged. If the device is on a tape device or in off-line storage, the documents may be pre-fetched. By pre-fetching documents, tape-stored documents or off-line storage avoids a subsequent delay time during the processing. Staging may also determine whether or not the document is within a database table. That is, the documents may be within a database instead of being within a file system. If the files are within a database, segments may be built. The rows of data in the database (BLOBs) may be used to create a file if this document is within a database. The staging phase 104 may also track the results of the staging phase, including the quantity of documents, time to execute, size of documents, and the number of errors.

In step 106, roving of the content repository using the text transformer may be managed. Roving is used to translate an image to text. Various parameters may be set for performing the roving. Managing the roving may coordinate threads to take advantage of processing schedules, use of multiple CPUs, and manage memory. The system may operate upon multiple batches in parallel. The system may allow administrators to define the level of parallel roving to manage. Managing the roving may also include splitting the work up into multiple streams to be operated upon.

In box 108, several steps that illustrate roving are set forth. The roving may take place using the image rover 16. In step 110, the image files are retrieved by the image text transformer 14 from the content repository 12. The metadata may also be retrieved in step 112. In step 114, the recognition of a particular form may be performed. For example, if the document is a particular type of document, this type of form may be recognized in the form-recognition step of 114. In step 116, if the document includes bar codes or supports bar-code recognition, a bar code transformation process may take place. The bar codes may, thus, be interpreted also in step 116. In step 118, an optical character recognition (OCR) process may be performed on the documents. The OCR process may use a number of types of processing.

As mentioned above, the OCR may be performed as a result of another process such as a facsimile recognition process that typically discards OCR results after field indexing is performed.

Steps 130-136 perform editing steps. In step 128, lexicons may be formed. The lexicons may be derived from extractions of a customer's structure data or may be a third-party linguistic analytical engine. Common lexicons may also be used as well as standard proper lexicons. Thus, various lexicons may be used to improve the optical character recognition results. In step 130, the lexicons are used to perform text resolution from the results of the optical character recognition. The text resolution is part of an editing block 126.

In step 132, linguistic analysis from a third-party analytic engine may also be used to help resolve the results of the optical character recognition. Further editing may include a grammar check 134. Various types of grammar checking are known, such as those used in word processors. In step 136, further editing may also take place. The spell check may be similar to that set forth in a word processor. It should be noted that the editing in steps 130-136 may be split apart and processed in parallel batches. An edit manager may be used to schedule and perform the edits illustrated in steps 130-136. After the editing steps in box 126, the image text transformer may encode in step 128 the information for storage in the reflection repository 22. In step 130, the reflection documents are stored in the reflection repository. A reflection repository may also store metadata.

The linguistic analysis, grammar check and spell check may be used to change the reflected document or may also be used to change the metadata. That is, if a grammar error in linguistic or spelling check is noted, the reflection document itself may not be modified but the metadata may be modified instead. Another alternative is for the end of the document to be modified with the correct grammar, spelling check, or linguistic change within the document but at the end of the document at the point of the change within the document.

The encoding and storing may be formed so that the reflected documents may easily be searched. The storing, as mentioned above, may also take place in the content repository. The reflected documents may be linked together with the image text document. Linking may be performed so that the same security for the image text document is applied to the reflected document. Each of the documents may have different levels of security, depending on the information contained therein.

Figure 3:
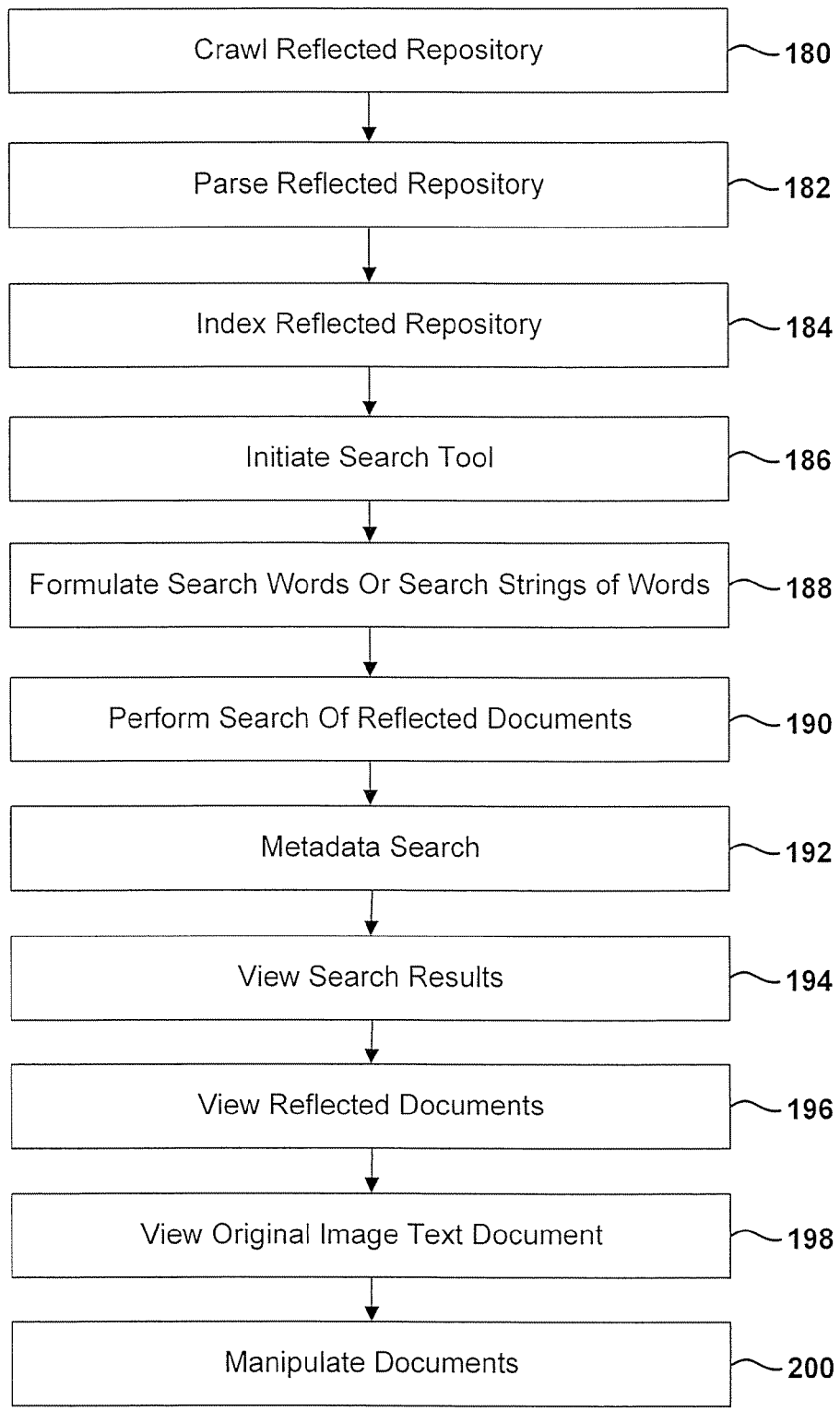
FIG. 3 is a flowchart of a method for searching and displaying according to the present disclosure.

Referring now to FIG. 3, a method for using the reflected documents is set forth. In step 180, a search engine may crawl the reflected repository. That is, the reflection repository documents may be traversed. In step 182, the reflected repository documents may be parsed so that the text of the documents is examined. In step 184, an index of the reflection repository may be created. The index creates a searchable text repository. The steps 180-184 may be performed at various times, including during an initial search, prior to any searching or after new documents are added to the reflection repository.

In step 186, the user initiates the search tool. In step 188, the user formulates search words or search strings of interest to the user. In step 190, a search of the reflected documents is performed. A search of the metadata may also be performed simultaneously with a search of the reflected documents. Searching takes place using the search engine 38 illustrated in FIG. 1. In step 194, search results may be viewed with the user device. Examples of screen displays of search results are set forth in FIGS. 4 and 5.

Figure 7:
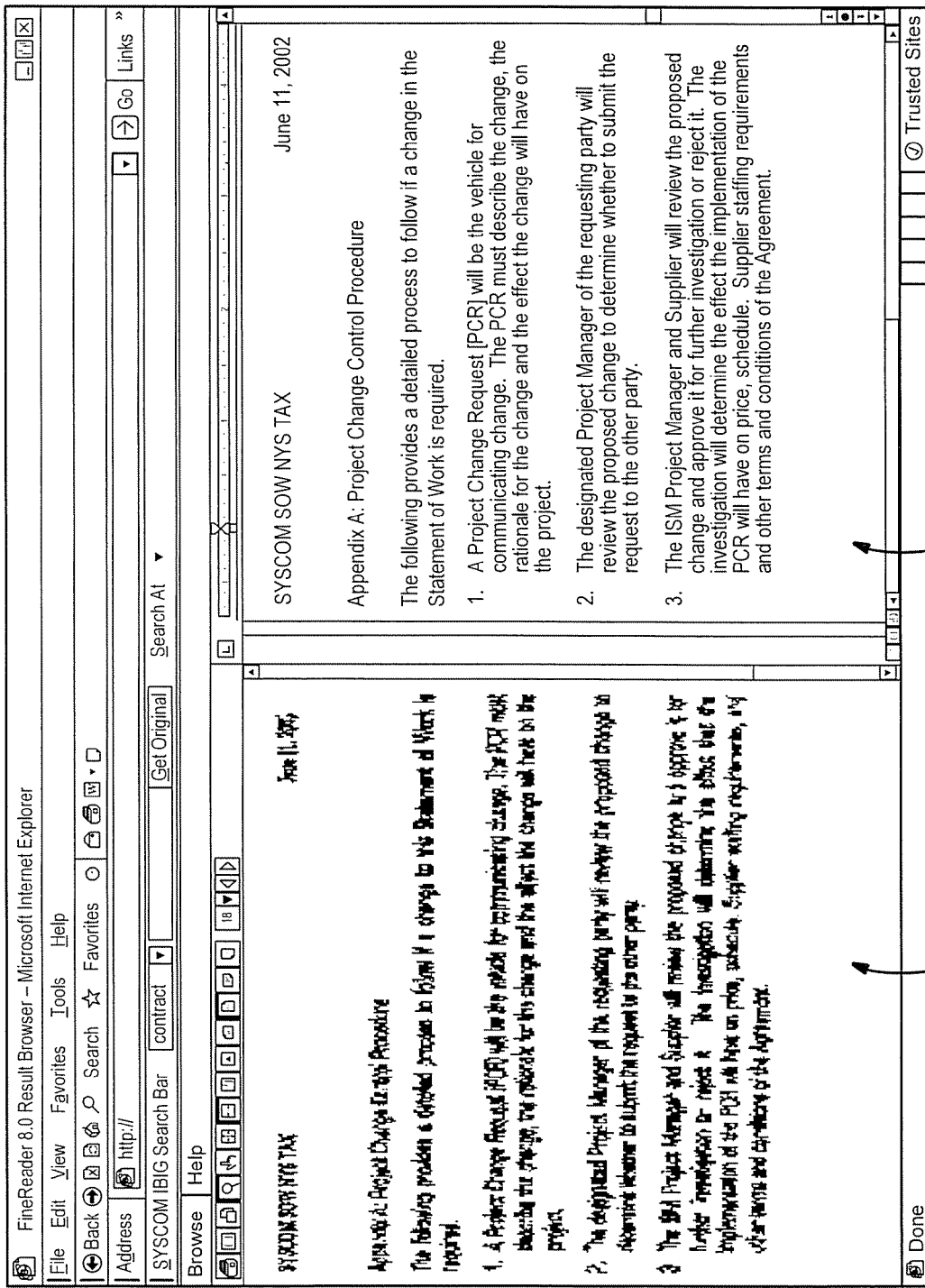
FIG. 7 is a screen display of a results viewer according to the present disclosure.

In step 196, the reflected documents may be viewed. In step 198, the original image text document may also be viewed. It should be noted that the reflected document may be viewed together with the original document as illustrated in FIG. 7. However, either of the reflected document or the original image text document may also be viewed. As mentioned above, in certain situations the reflected documents may be discarded or deleted after the search index is formed. Therefore, only the image text document may be viewed, but the reflected documents used to perform the search index and finding the image text document are not viewed.

In step 200, the documents may be manipulated. That is, various portions of the document may be scrolled, zoomed, panned, rotated, fitted, sized, or negatives made. Also, further manipulations may be performed by annotating, copying, sending, printing, or changing the properties of the document. Spell checking and grammar checking may also be performed after viewing the reflected document. The changes may be performed in the reflected document or in the metadata. Other manipulations include synchronizing the document, highlighting, dual highlighting, scrolling, dual scrolling, viewing edits, and the like. The viewing edits may be performed by looking at both documents and editing the text of the reflected document.

Figure 4:
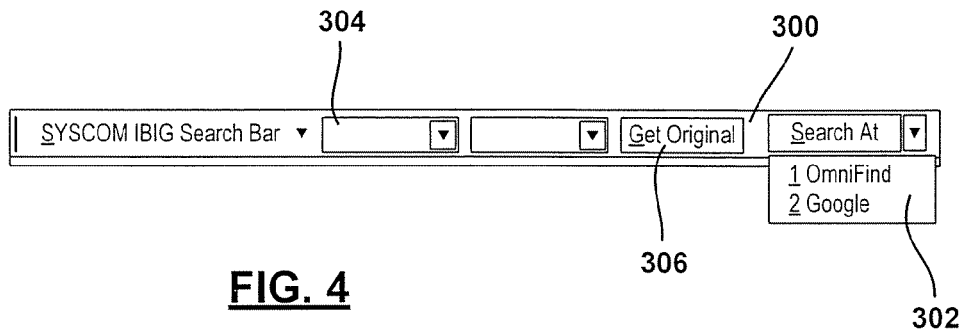
FIG. 4 is a screen display of a search bar according to the present disclosure.

Referring now to FIG. 4, a search bar 300 is illustrated having various search selections 302. In this example, the search engine used may be Omnifind® or Google®. Either of these may be selected for the search engine. In box 304, the user may input various search terms. Box 306 allows the user to get the original document.

Figure 5:
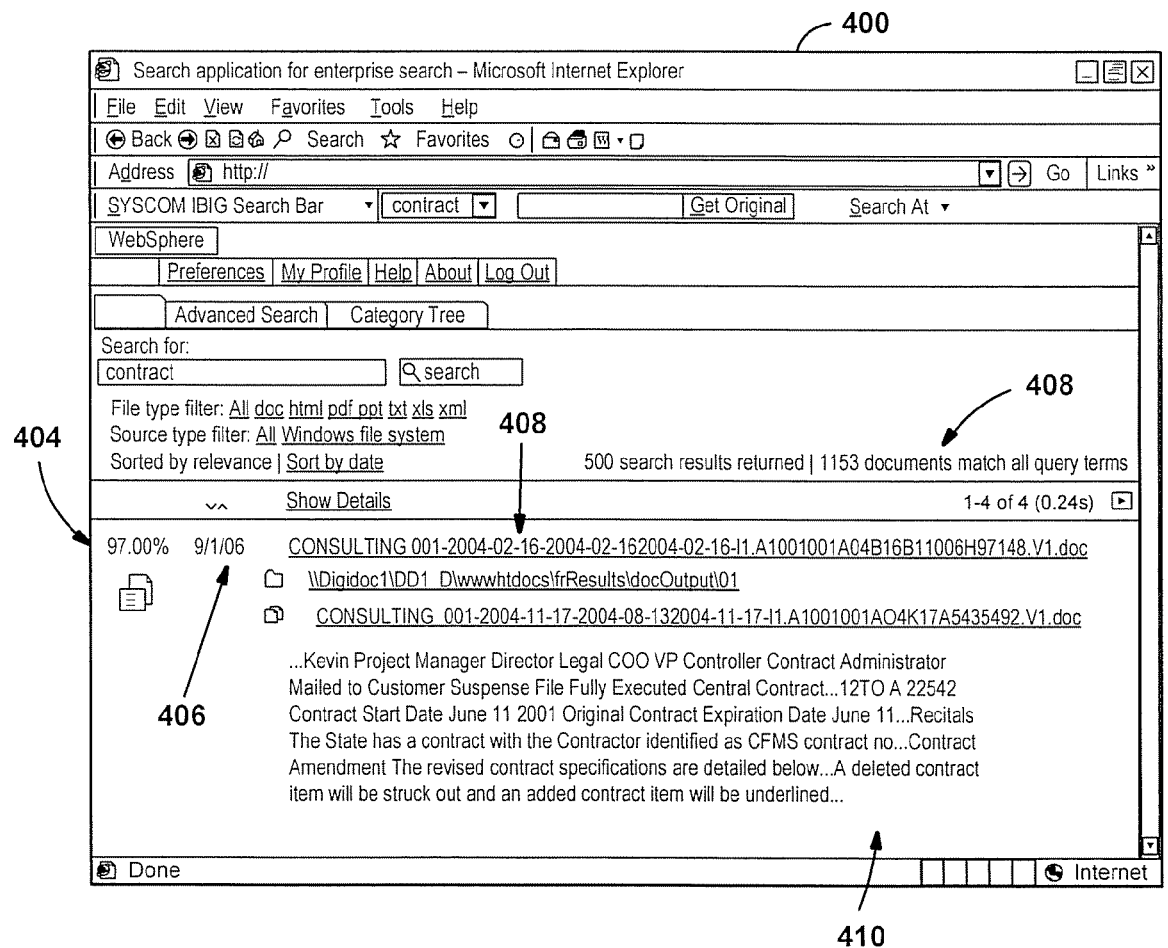
FIG. 5 is a first screen display of a search result using a first search engine according to the present disclosure.

Referring now to FIG. 5, a window 400 in a browser illustrating the search results 402 is illustrated. In this example, the relevancy number is indicated at 404. Also, the date the document was created is illustrated at 406. The document title is illustrated at 408. It should be noted that the document title may be formed from the image text document or may be formed from metadata associated with the image text document or a combination of both. Under the title, portions of the reflected document 410 may be provided with the search term highlighted therein. Each of the results may contain similar formatting with a different relevancy depending on the frequency of the search term selected by the user. The search results are from an Omnifind® search engine.

Figure 6:
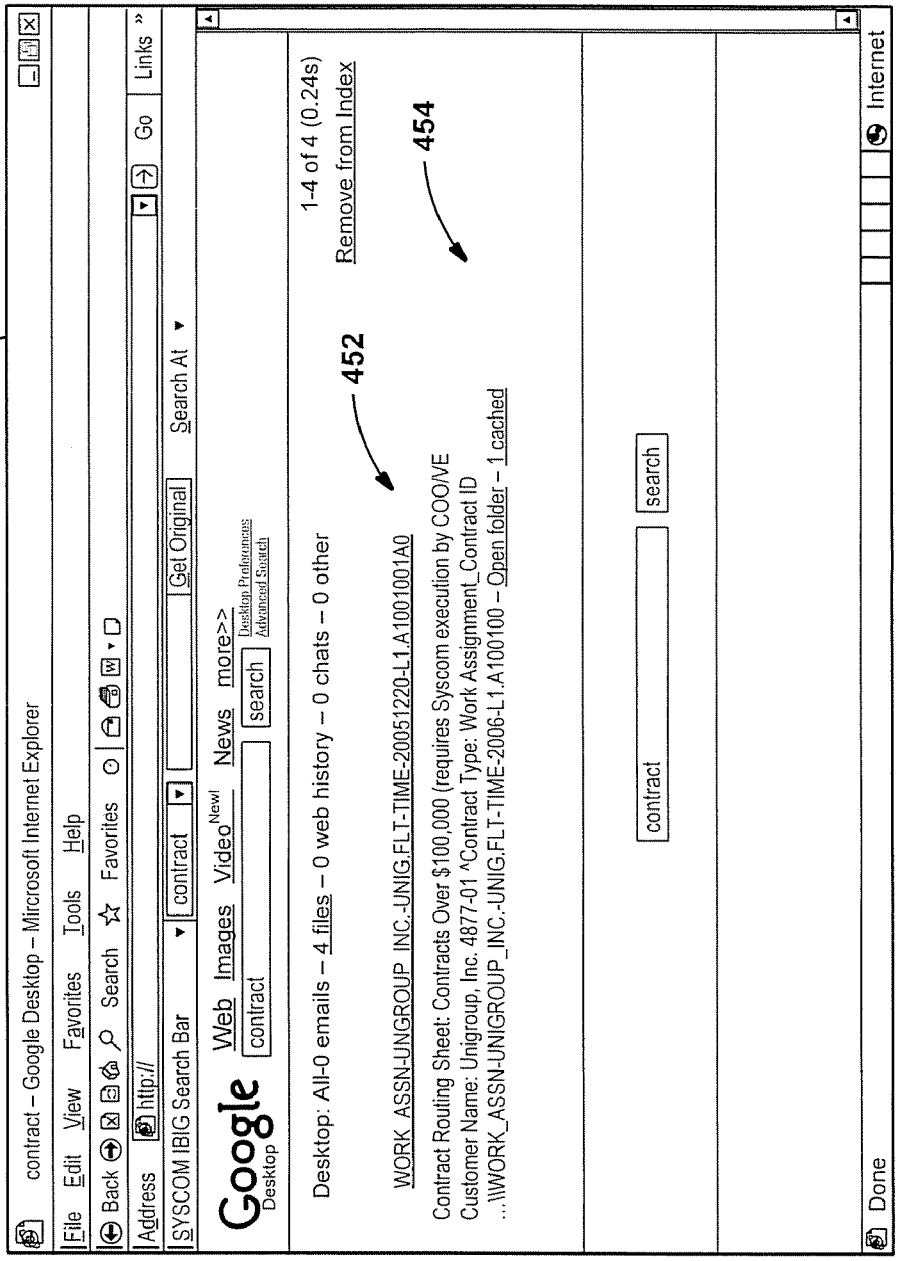
FIG. 6 is a second screen display of a search result using a second search engine according to the present disclosure.

Referring now to FIG. 6, a window 450 illustrating the results of a search using Google® is illustrated. In this example, the titles of the document are illustrated at 452. Also, portions of the document are set forth in 454. The display is set up in terms of relevancy.

Referring now to FIG. 7, a screen display 500 is illustrated having a first image text document 502 from the image text documents displayed side-by-side with a first reflected document 504 from the reflected documents. As can be seen, a direct correspondence is set forth between the terms in the image text document 502 and the reflected document 504. During this time, the user may choose to manipulate, add to, or otherwise change the reflected document or its metadata.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of searching image text documents comprising:

performing optical character recognition on image text documents having text images therein to form optical character recognition results, the image text documents stored in a content repository;

linguistically analyzing the optical character recognition results within a context of multiple lexicons to form edited text results;

creating reflection files corresponding to the image text documents from the edited text results;

storing the reflection files in a reflection repository;

searching the reflection files; and displaying a first reflection file from the reflection files or a first image text document from the image text documents in response to searching.

2. A method as recited in claim 1 further comprising storing the image text documents in the content repository prior to performing optical character recognition.

3. A method as recited in claim 2 further comprising storing metadata associated with the image text documents in the content repository.

4. A method as recited in claim 1 wherein the multiple lexicons include custom lexicons.

5. A method as recited in claim 1 comprising grammatically analyzing the optical character recognition results to form the edited results.

6. A method as recited in claim 1 comprising spell checking the optical character recognition results to form the edited text results.

7. A method as recited in claim 1 further comprising displaying a plurality of search results in response to searching.

8. A method as recited in claim 7 further comprising selecting a first search result from the plurality of search results and wherein displaying comprises displaying the first reflection file from the reflection files or the first image document from the image documents in response to searching and selecting.

9. A method as recited in claim 1 wherein displaying a first reflection file from the reflection files or a first image document comprises displaying the first reflection file and the first image text document.

10. A method as recited in claim 1 wherein the reflection repository and the content repository are co-located.

11. A method as recited in claim 1 further comprising linking a first text image and the first reflection file in the content repository.

12. A method as recited in claim 1 further comprising linking a first text image and a first reflection file in the content repository with a security setting of the first text image.

13. A method as recited in claim 1 further comprising forming a search index from the reflected files and wherein searching comprises searching the search index.

14. A method as recited in claim 13 further comprising deleting the text documents after forming an index.

15. A method as recited in claim 1 further comprising associating metadata with each of the image text documents.

16. A method as recited in claim 15 further comprising naming each image text document in response to the respective metadata.

17. A method as recited in claim 16 wherein searching comprises searching the content of each image text documents and the metadata.

18. A system for searching image text documents comprising:
  an image text transformer performing optical character recognition on image text documents having text images therein to form optical character recognition results, linguistically analyzing the optical character recognition results within a context of multiple lexicons to form edited text results, and creating reflection files corresponding to the image text documents from the edited text results;
  a reflection repository storing the reflection files therein;
  a search engine searching the reflection files; and
  a user device displaying a first reflection file from the reflection files or a first image text document from the image text documents in response to searching.

19. A system as recited in claim 18 further comprising a content repository storing the image text documents therein.

20. A system as recited in claim 19 wherein the reflection repository and the content repository are co-located.

21. A system as recited in claim 19 wherein the image text transformer stores the reflection files in the content repository.

22. A system as recited in claim 19 wherein the content repository stores metadata associated with the image text documents.

23. A system as recited in claim 19 wherein the image text transformer links a first text image and a first reflection file in the content repository.

24. A system as recited in claim 19 wherein the image text transformer links a first text image and a first reflection file in the content repository with a security setting of the first text image.

25. A system as recited in claim 18 wherein the multiple lexicons include custom lexicons for a particular application.

26. A system as recited in claim 18 wherein the image text transformer further grammatically analyzes the optical character recognition results to form the edited text results.

27. A system as recited in claim 18 wherein the image text transformer further spell checks the optical character recognition results to form the edited text results.

28. A system as recited in claim 18 wherein the user device displays a plurality of search results in response to searching.

29. A system as recited in claim 28 wherein the user device selects a first search result from the plurality of search results and displays the first reflection file from the reflection files or the first image document from the image documents.

30. A system as recited in claim 18 wherein the user device displays a first reflection file from the reflection files and a first image document.

31. A system as recited in claim 18 wherein the search engine forms a search index from the reflection files and searches the search index.

32. A system as recited in claim 18 wherein the user device displays a search bar for inputting search terms into the search engine.

* * * * *